US011594054B2

(12) United States Patent
Walters et al.

(10) Patent No.: US 11,594,054 B2
(45) Date of Patent: Feb. 28, 2023

(54) DOCUMENT LINEAGE MANAGEMENT SYSTEM

(71) Applicant: Capital One Services, LLC, McLean, VA (US)

(72) Inventors: Austin Walters, Savoy, IL (US);
Jeremy Goodsitt, Champaign, IL (US);
Galen Rafferty, Mahomet, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/249,086

(22) Filed: Feb. 19, 2021

(65) Prior Publication Data
US 2022/0269884 A1    Aug. 25, 2022

(51) Int. Cl.
| | |
|---|---|
| G06V 30/40 | (2022.01) |
| G06K 9/62 | (2022.01) |
| G06N 3/08 | (2023.01) |
| G06F 3/04845 | (2022.01) |
| G06F 40/205 | (2020.01) |
| G06F 40/166 | (2020.01) |
| G06F 3/04842 | (2022.01) |
| G06N 3/04 | (2023.01) |
| G06V 10/75 | (2022.01) |

(52) U.S. Cl.
CPC .......... *G06V 30/40* (2022.01); *G06F 3/04842* (2013.01); *G06F 3/04845* (2013.01); *G06F 40/166* (2020.01); *G06F 40/205* (2020.01); *G06K 9/6215* (2013.01); *G06N 3/0454* (2013.01); *G06N 3/08* (2013.01); *G06V 10/751* (2022.01)

(58) Field of Classification Search
CPC ............. G06K 9/00442; G06K 9/6202; G06K 9/6215; G06F 3/04845; G06F 3/04842; G06F 40/166; G06F 40/255; G06N 3/0454; G06N 3/08; G06V 10/751; G06V 30/40
USPC ....................................................... 715/229
See application file for complete search history.

(56) References Cited

U.S. PATENT DOCUMENTS

| | | | | |
|---|---|---|---|---|
| 5,758,358 | A * | 5/1998 | Ebbo | .................... G06F 16/1873 |
| 6,560,620 | B1 * | 5/2003 | Ching | .................... G06F 40/194 |
| | | | | 715/229 |
| 7,490,116 | B2 | 2/2009 | Carson et al. | |
| 8,140,449 | B1 | 3/2012 | Kumar et al. | |
| 8,196,030 | B1 * | 6/2012 | Wang | ................. G06K 9/00442 |
| | | | | 715/200 |

(Continued)

*Primary Examiner* — Andrew R Dyer
(74) *Attorney, Agent, or Firm* — Harrity & Harrity, LLP

(57) ABSTRACT

In some implementations, a system may obtain document lineage training data associated with a plurality of historical documents and corresponding lineage data of independent historical documents of the plurality of historical documents. The system may train, based on the document lineage training data, a lineage analysis model to determine a lineage of edited sections of a source document. The system may receive a plurality of document files that correspond to a plurality of versions of a document. The system may determine, using a similarity analysis model, that a first section from a first version of the plurality of versions corresponds to a second section from a second version of the plurality of versions. The system may determine, using the lineage analysis model, a lineage of a corresponding section of the document that is associated with the first section and the second section.

20 Claims, 8 Drawing Sheets

(56) References Cited

U.S. PATENT DOCUMENTS

| | | | |
|---|---|---|---|
| 8,738,706 B1* | 5/2014 | Grieve | G06F 40/151 |
| | | | 709/205 |
| 8,954,434 B2 | 2/2015 | Ahn et al. | |
| 9,069,751 B1* | 6/2015 | Nestler | G06F 40/205 |
| 10,121,019 B2* | 11/2018 | Struttmann | H04L 9/0618 |
| 10,585,989 B1* | 3/2020 | Ahmed | G06N 3/08 |
| 10,599,753 B1 | 3/2020 | Eisner et al. | |
| 10,733,374 B1* | 8/2020 | Samid | G06F 16/58 |
| 11,003,839 B1* | 5/2021 | Hatch | G06F 40/166 |
| 2006/0136809 A1* | 6/2006 | Fernstrom | G06F 40/186 |
| | | | 715/255 |
| 2007/0046982 A1* | 3/2007 | Hull | G06V 30/40 |
| | | | 358/1.15 |
| 2008/0040388 A1* | 2/2008 | Petri | G06F 16/1734 |
| 2008/0275918 A1* | 11/2008 | Miura | G06F 16/93 |
| 2012/0072859 A1* | 3/2012 | Wang | G06K 9/00442 |
| | | | 715/764 |
| 2014/0281877 A1* | 9/2014 | Burge | G06F 16/958 |
| | | | 715/230 |
| 2014/0379657 A1 | 12/2014 | Avery et al. | |
| 2017/0039176 A1* | 2/2017 | Broderick | G06F 40/166 |
| 2017/0289234 A1* | 10/2017 | Andreou | G06F 16/4393 |
| 2018/0285326 A1* | 10/2018 | Goyal | G06F 40/166 |
| 2019/0179680 A1* | 6/2019 | Von Haden | G06F 3/0483 |
| 2019/0286741 A1 | 9/2019 | Agarwal et al. | |
| 2019/0384807 A1* | 12/2019 | Dernoncourt | G06F 16/93 |
| 2020/0162561 A1* | 5/2020 | Milvaney | G06F 40/166 |
| 2020/0279004 A1* | 9/2020 | Serdy | G06F 16/93 |
| 2020/0302011 A1* | 9/2020 | Mishra | G06F 40/30 |
| 2020/0334326 A1* | 10/2020 | Zhang | G06N 20/00 |
| 2020/0372405 A1* | 11/2020 | Garcia | G06F 16/93 |
| 2020/0387567 A1* | 12/2020 | Loforte | G06F 16/313 |
| 2021/0057100 A1* | 2/2021 | Neumann | G06K 9/6256 |
| 2021/0081613 A1* | 3/2021 | Begun | G06F 40/289 |
| 2021/0089963 A1* | 3/2021 | Baek | H04L 67/306 |
| 2021/0133498 A1* | 5/2021 | Zhang | G06K 9/00483 |
| 2021/0174078 A1* | 6/2021 | Harada | G06F 40/20 |
| 2021/0209357 A1* | 7/2021 | Alikhani | G06V 30/416 |
| 2022/0236857 A1* | 7/2022 | Sharifi | G06F 3/0481 |

\* cited by examiner

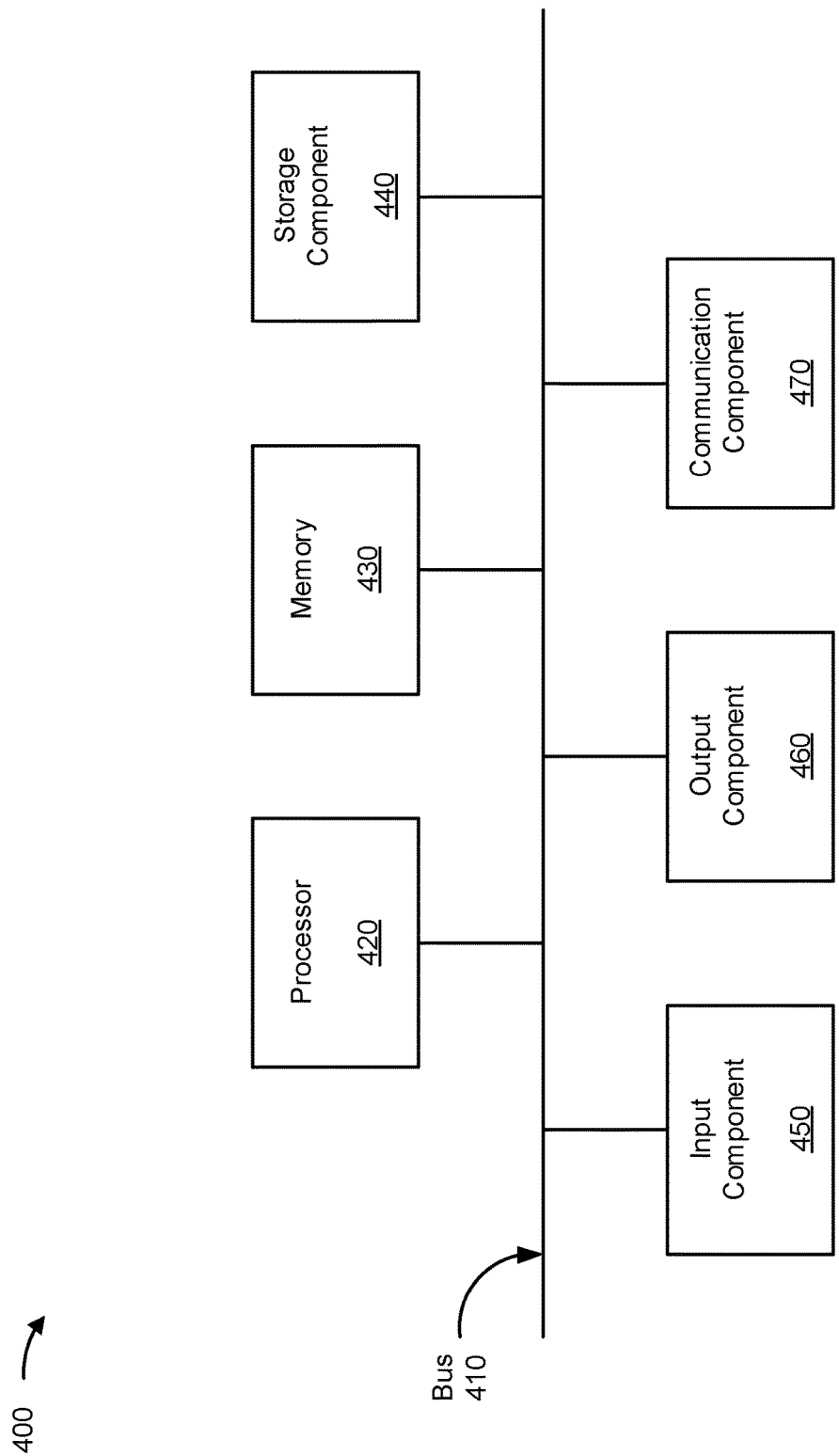

```
500 ─┐
```

510 — Obtain document lineage training data associated with a plurality of historical documents and corresponding lineage data of the plurality of historical documents

520 — Train, based on the document lineage training data, a lineage analysis model to determine a lineage of edited sections of a source document

530 — Receive a plurality of versions of a document

540 — Process a first version of the plurality of versions to identify a first set of sections of the document and a second version of the plurality of versions to identify a second set of sections of the document

550 — Determine, using a similarity analysis model, that a first section from the first set of sections and a second section from the second set of sections correspond to a particular section of the document

560 — Determine, using the lineage analysis model, a lineage of the particular section

570 — Indicate the lineage in association with the first section and the second section to facilitate editing of the particular section of the document

FIG. 5

DOCUMENT LINEAGE MANAGEMENT SYSTEM

BACKGROUND

Data lineage of data includes the data's origin, processing performed on the data, where the data moves, and/or the like. Correspondingly, document lineage identifies a document's origin, adjustments to the document, from where the document was adjusted (a device used to adjust the document), who adjusted the document, and/or when the document was adjusted. Document lineage provides the ability to trace errors in the document, to access past portions or inputs associated with the document (e.g., for reviewing and/or analyzing the document). Document lineage can provide an audit trail of the document.

SUMMARY

In some implementations, a system for managing document lineage includes one or more memories and one or more processors, communicatively coupled to the one or more memories, configured to: obtain document lineage training data associated with a plurality of historical documents and corresponding lineage data of the plurality of historical documents, wherein the lineage data identifies respective sequences of versions of the historical documents; train, based on the document lineage training data, a lineage analysis model to determine a lineage of edited sections of a source document, wherein the lineage analysis model includes a machine learning model that is trained based on respective lineages of versions of the plurality of historical documents that are identified in the corresponding lineage data; receive a plurality of versions of a document, wherein the plurality of versions of the document comprise separate documents associated with a lineage of the document; process a first version of the plurality of versions to identify a first set of sections of the document and a second version of the plurality of versions to identify a second set of sections of the document; determine, using a similarity analysis model, that a first section from the first set of sections and a second section from the second set of sections correspond to a particular section of the document; determine, using the lineage analysis model, a lineage of the particular section; and indicate the lineage in association with the first section and the second section to facilitate editing of the particular section of the document.

In some implementations, a method for managing document lineage includes obtaining document lineage training data associated with a plurality of historical documents and corresponding lineage data of independent historical documents of the plurality of historical documents, wherein the corresponding lineage data indicates relative timing of respective versions of the plurality of historical documents; training, based on the document lineage training data, a lineage analysis model to determine a lineage of edited sections of a source document; receiving a plurality of document files, wherein the plurality of document files correspond to a plurality of versions of a document; determining, using a similarity analysis model, that a first section from a first version of the plurality of versions corresponds to a second section from a second version of the plurality of versions; determining, using the lineage analysis model, a lineage of a corresponding section of the document that is associated with the first section and the second section, wherein the lineage indicates a sequential relationship between the first section and the second section; and outputting the lineage in association with facilitating editing of the corresponding section of the document.

In some implementations, a non-transitory computer-readable medium storing a set of instructions includes one or more instructions that, when executed by one or more processors of a system, cause the system to: receive a plurality of versions of a document; parse a first version of the plurality of versions into a first set of sections of the document; parse a second version of the plurality of versions into a second set of sections of the document; determine, using a similarity analysis model, that a first section from the first set of sections corresponds to a second section from the second set of sections; determine, using a lineage analysis model, a lineage associated with the first section and the second section, wherein the lineage analysis model includes a machine learning model that is trained based on respective lineages of versions of a plurality of historical documents and differences between the versions of the plurality of historical documents; and provide, via a user interface, the lineage in association with the first section and the second section to facilitate editing of the document.

BRIEF DESCRIPTION OF THE DRAWINGS

FIG. 4 is a diagram of example components of one or more devices of FIG. 3.

FIG. 5 is a flowchart of an example process relating to managing document lineage.

DETAILED DESCRIPTION

Figure 1A:
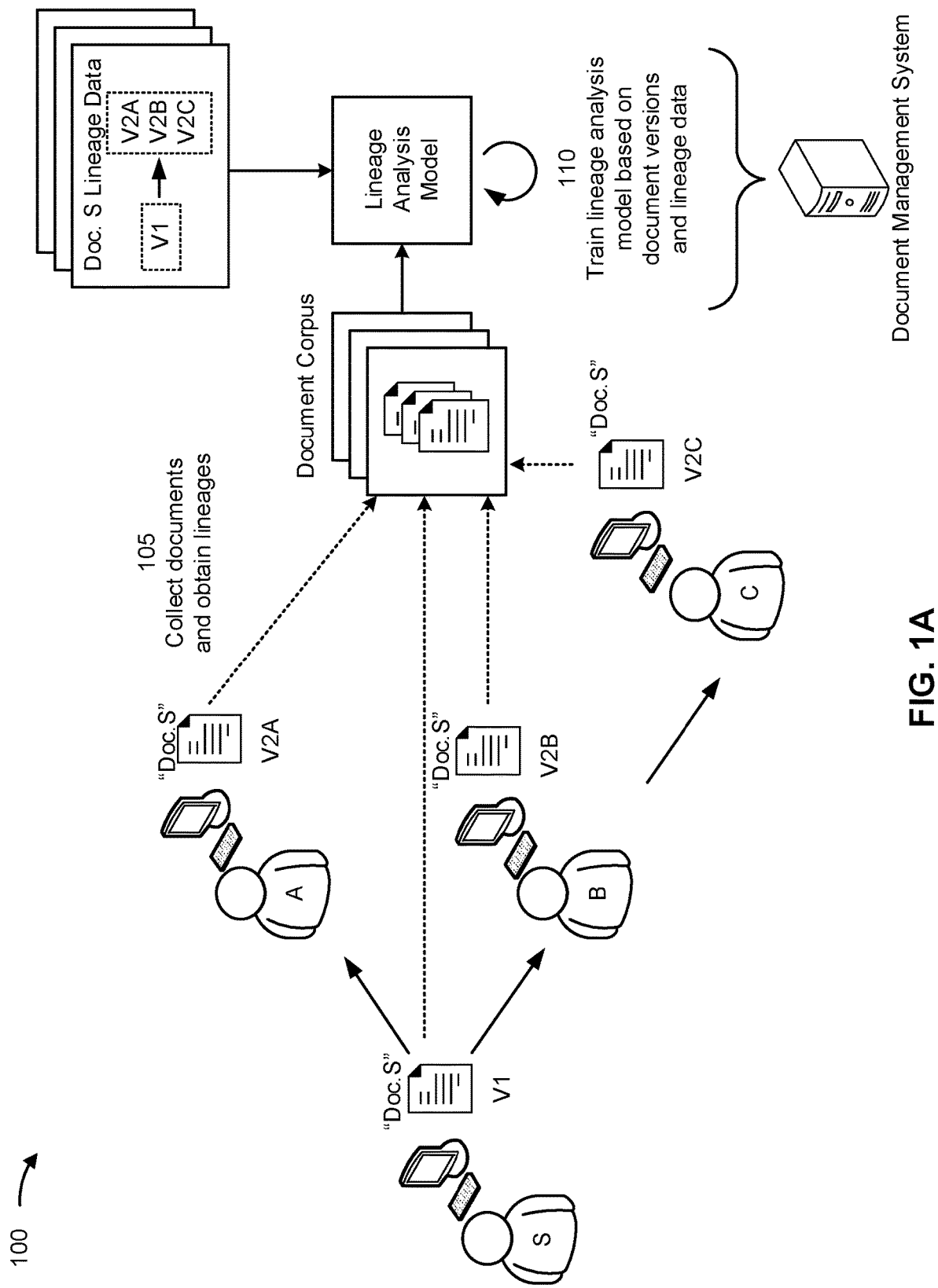
FIGS. 1A-1D are diagrams of an example implementation relating to managing document lineage.

The following detailed description of example implementations refers to the accompanying drawings. The same reference numbers in different drawings may identify the same or similar elements.

In some instances, multiple parties (e.g., individuals and/or organizations) are to cooperate to draft and finalize information and/or data associated with a project. For example, the information and/or data may be generated, stored, and/or managed within a file. The file may correspond to a document (e.g., an electronic document that stores text and/or media in electronic form), a media file (e.g., an image file, an audio file, and/or a video file), and/or an executable file (e.g., a program formed from code). While certain shared environments (e.g., cloud-based applications, cloud-based platforms, and/or a cloud-computing system) exist that allow for shared access to a working version of a file, these shared environments typically require a network connection and/or a communication link to be established to the shared environment and/or platform. Accordingly, in some cases, when such an environment is unavailable (e.g., whether by choice or because one or more of the parties are unable to connect to the environment), individual parties may use separate devices to draft and/or revise separate files corresponding to the same project. For example, the separate files may correspond to separate versions of a same document that can be independently edited by the individual parties. Furthermore, multiple parties may separately edit a same version of the document.

Accordingly, when cooperating to finalize the document for the project, the individual parties may need to analyze and/or review multiple versions of the document (corresponding to separate files associated with the document) to determine which edits and/or sections of the document are to be selected to be included within a finalized version of the draft. A document lineage can be used to review and/or select which edits and/or sections to include in a finalized draft. For example, the document lineage may indicate timing of revisions to a document, a sequence of revisions to a document, and/or which party made the revisions (e.g., using an identifier of the party or a user device that made the revisions). However, because multiple working versions of the document may be independently generated and/or revised during a drafting phase of the document, as described above, the separate devices may be unable to track lineage of the document. Although respective document lineages may be determined and/or obtained from corresponding metadata associated with the individual files, the lineage data may not always be accurate and/or available. For example, timing information may be generated based on an inaccurate time of the local device and/or the metadata may be incomplete (e.g., if a user did not activate a lineage tracking tool of the document).

Some implementations described herein provide a document management system that robustly determines and/or manages a lineage of a document that is individually and/or independently edited by separate devices. For example, the document management system may determine and/or indicate a lineage of a section of the document based on an analysis of corresponding sections of the document that are separately generated and/or revised in separate versions of the document. The document management system may utilize a machine learning model and/or a similarity analysis model to compare corresponding sections of a document and determine the lineage of the sections according to identified characteristics in differences between the sections. Therefore, the document management system may robustly determine or predict a data lineage of a document without using metadata associated with the document. In some implementations, available metadata may be used to supplement one or more analyses described herein to determine a document lineage and/or to verify a predicted document lineage determined by the one or more analyses described herein. Accordingly, the document management system may more accurately determine a document lineage relative to other systems that do not utilize a document management system as described herein.

In some implementations, as described herein, the document management system may utilize a machine learning model to learn and/or identify lineages of documents based on lineage data associated with a document corpus to determine a lineage of a document based on separately maintained files associated with the document (e.g., separately generated and/or revised versions of the document). The document corpus may include hundreds, thousands, millions, or more historical documents (each being associated with separate versions that include hundreds, thousands, millions, or more edits) and/or historical sections of historical documents. The historical documents and/or the sections of the historical documents may be related in one or more ways to a document and/or a section that is being analyzed (e.g., based on the historical documents or the historical sections being a same type and/or having a same purpose). Accordingly, the machine learning model may more accurately and/or efficiently determine a lineage of a document based on identifying and/or focusing on edits and/or revisions in similar or corresponding sections, relative to determining the document lineage using unrelated or irrelevant documents and/or irrelevant sections.

A file may include relatively large amounts of data. For example, a document may include hundreds, thousands, or more paragraphs of text and/or hundreds, thousands, or more pages of text. Accordingly, when a document lineage is to be determined based on a comparison of separate versions of a document, the document management system may consume a relatively large amount of resources to obtain, process, and/or analyze sections of the separate versions to determine a lineage of the sections. For example, the document management system may consume computing resources (e.g., processor resources, memory resources, and/or power resources) to individually process and/or analyze corresponding sections of the document in the separate versions. In some implementations, the document management system may efficiently identify and/or process sections of the document that are to be used to determine a document lineage of the document and/or a lineage of the sections. For example, the document management system may filter out sections from the documents that do not include edits and/or that are not different from one another in the separate versions. Additionally, or alternatively, the document management system may learn, using the machine learning model, to identify certain sections that are relatively more likely to indicate a document lineage of the document (e.g., sections known to have been previously revised and/or edited relative to another version of the document) and focus an analysis on analyzing one or more of the certain sections prior to other sections that are determined to be less likely to indicate a document lineage, to permit the document management system to more quickly and efficiently determine a document lineage of the document. In this way, the document management system may reduce and/or conserve computing resources associated with obtaining, processing, and/or analyzing separate versions of a document relative to other systems or relative to manually reviewing the separate versions.

FIGS. 1A-1D are diagrams of an example implementation 100 associated with managing document lineage. As shown in FIGS. 1A-1D, example implementation 100 includes multiple source devices, and an editing device. These devices are described in more detail below in connection with FIG. 3 and FIG. 4.

As shown in FIG. 1A, and by reference number 105, the document management system collects documents and obtains lineages. For example, the documents may correspond to historical documents and the lineages may correspond to lineage data associated with the historical documents. More specifically, the historical documents may be associated with previously generated and/or edited documents associated with one or more parties (e.g., an individual or organization associated with the document management system). Accordingly, the historical documents may include subsets of documents corresponding to different versions of a same document or a document associated with a same lineage. As described elsewhere herein, the historical documents and the lineage data may correspond to document lineage training data that may be used to train a lineage analysis model of the document management system. In some implementations, the lineage data may include and/or indicate relative timing of respective versions of the historical documents (e.g., corresponding timestamps of the respective versions) and/or respective sequences of versions of the historical documents (e.g., corresponding sequence identifiers of the respective versions).

The document management system may store and/or maintain the historical documents in a data structure, shown as the Document Corpus. The data structure may include a table, an index, a database, a graph, or any other suitable data structure. In some implementations, the Document Corpus may be sorted and/or organized according to one or more characteristics of the historical documents (e.g., timestamps associated with the historical documents, types of the historical documents, purposes of the historical documents, sources of the historical documents, and/or parties associated with the historical documents, among other examples).

As illustrated in FIG. 1A, a first version (V1) of a source document (Doc.S) may be generated by a first user (User S). Further, a second version (V2A) of the source document may be obtained and/or generated by a second user (User A), a third version (V2B) of the source document may be obtained and/or generated by a third user (User B), and a fourth version of the source document may be obtained and/or generated by a fourth user (User C). As shown, User A may independently generate V2A from V1, User B may independently generate V2B from V1, and User C may independently generate V2C from V2B. Accordingly, a timing and/or sequence of the lineage data of V1, V2A, V2B, and V2C may be [V1>V2A; V1>V2B>V2C] indicating that V1 is the original document, V2A and V2B were independently generated from V1, and that V2C was generated from V2B. The lineage data may be provided to the lineage analysis model to permit the document management system to train the lineage analysis model according to versions V1, V2A, V2B, and V2C and the lineage data, as described elsewhere herein (e.g., to permit the document management system to identify a lineage without relying on metadata associated with separately generated versions of a document).

As further shown in FIG. 1A, and by reference number 110, the document management system trains the lineage analysis model based on document versions and lineage data. For example, the document management system may train a machine learning model associated with the lineage analysis model to determine a lineage of edited sections of a source document that is independently revised and/or edited by separate devices and/or individual parties. Additionally, or alternatively, the machine learning model may be trained (e.g., by another system) based on respective lineages of versions of the plurality of historical documents that are identified in corresponding lineage data.

In some implementations, the machine learning model may include a neural network (e.g., a long short-term memory (LSTM) network, a recurrent neural network (RNN), a convolutional neural network (CNN)), an encoder, and/or a decoder. For example, to train the machine learning model, the document management system may generate an LSTM RNN based on the historical documents (or a subset of the historical documents) and/or corresponding lineage data of the set of the historical documents. Additionally, or alternatively, the document management system may generate a CNN encoder based on the historical documents and/or the lineage data and train an LSTM decoder for the CNN encoder. In some implementations, the document management system may generate and/or utilize a transformer encoder based on the historical documents and the corresponding lineage data and train the LSTM decoder according to the transformer encoder. In some implementations, the type of machine learning model and/or configuration of the machine learning model may be based on one or more characteristics of the historical documents used to train the machine learning model. For example, a first type of machine learning model may be used for a first type of document (e.g., an article) and a second type of machine learning model may be used for a second type of document (e.g., a contract).

Accordingly, the machine learning model may be trained according to the lineage data and differences between respective sets of versions of the subsets of historical documents. In some implementations, as described elsewhere herein, the lineage analysis model may utilize a natural language processing model to identify differences between corresponding sections of a source document. Additionally, or alternatively, the linear analysis model may use natural language processing to detect types of differences between corresponding sections of a section of the source document. For example, the linear analysis model may use the natural language processing to identify grammatical edits (e.g., edits to correct incorrect spelling, incorrect singular or plural form of nouns, incorrect verb tense, incorrect noun/verb agreement, and/or typographical errors, among other examples). Additionally, or alternatively, the linear analysis model may use natural language processing to identify conciseness-based edits (e.g., edits to reduce a word count or length of the section without sacrificing an accurate description of content or substance in the section). In some implementations, the linear analysis model may use natural language processing to identify substantive edits (e.g., edits that increase or decrease an amount of content in the section). In some implementations, the linear analysis may be trained to utilize the type of identified edits to determine a lineage of a section. For example, improved grammar from a first section to a second section may indicate that the second section is based on and/or revised from the first version. Similarly, improved conciseness and/or substance from a first section to a second section may indicate that the second section is based on and/or revised from the first version.

In some implementations, the document management system may train the linear analysis model to identify characteristics associated with sections and/or edits to the sections that can be used to filter and/or preprocess a source document to more efficiently determine a lineage of the source document (and/or a section of the source document). For example, based on a type of the document, a type of the section, and/or a type of an identified edit, the document management system may filter (e.g., using a decision tree) certain sections from a received version associated with the source document to prevent the document management system from having to analyze all sections of the version and/or to prevent the document management system from analyzing sections in the version that are likely irrelevant with respect to determining a lineage of the section and/or the document. More specifically, the document management system may more efficiently process the version by avoiding processing sections that likely do not involve a revision or that involve a revision that is not indicative of a lineage of the section or the document, as learned by a machine learning model described elsewhere herein. The linear analysis model may be trained and/or utilized as further described in connection with FIG. 2.

Figure 1B:
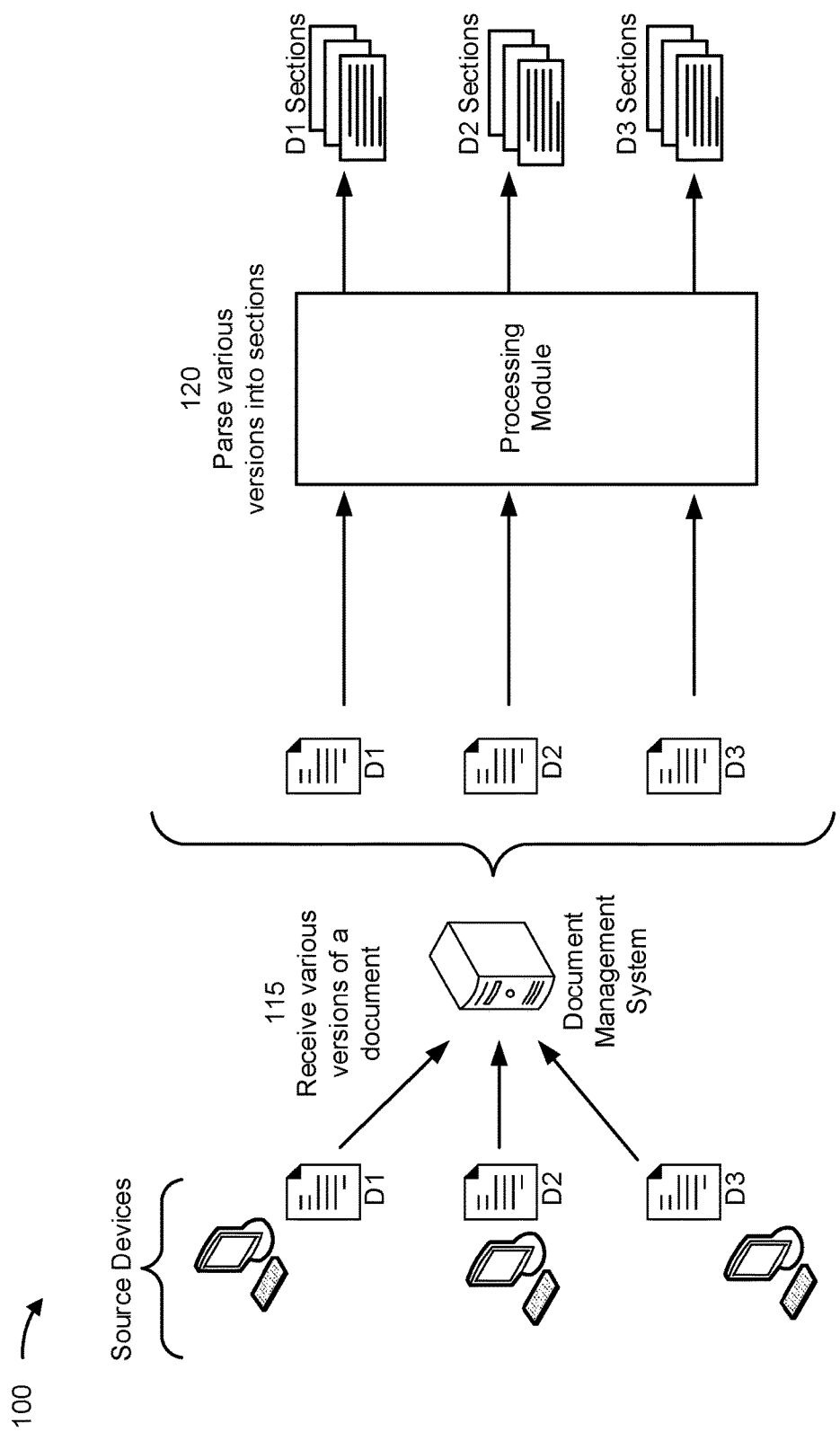

As shown in FIG. 1B, and by reference number 115, the document management system receives various versions of a document. For example, the document may correspond to a source document and the various versions may correspond to separately formed files (shown as D1, D2, and D3). The separately formed files may correspond to separate documents that are formed from separate instantiations (or copies) of the source document. As shown, D1, D2, and D3

(referred to collectively as "the documents") may be provided from a plurality of source devices (e.g., each of the source devices provides one of D1, D2, or D3). Accordingly, the various versions may correspond to a plurality of versions the document and/or separate versions of the document that are associated with a same lineage (e.g., a draft lineage) of the document.

As further shown in FIG. 1B, and by reference number 120, the document management system parses the various versions into sections. As described above, the various versions may correspond to separate documents that are formed from the source document. The document management system, using a processing module, may parse the documents into sections. For example, the processing module may use the natural language processing model to parse a first document (e.g., a first version of the source document) into a first set of sections and a second document (e.g., a second version of the source document) into a second set of sections. In some implementations, the natural language processing model may be trained and/or configured to parse the documents into sections based on a type of the document (e.g., whether a structured document or an unstructured document) and/or structural elements of the document (e.g., headings, titles, paragraphs, punctuation, and/or line returns). In this way, the linear analysis model may perform and/or utilize natural language processing to separate the documents into corresponding sets of sections.

Figure 1C:
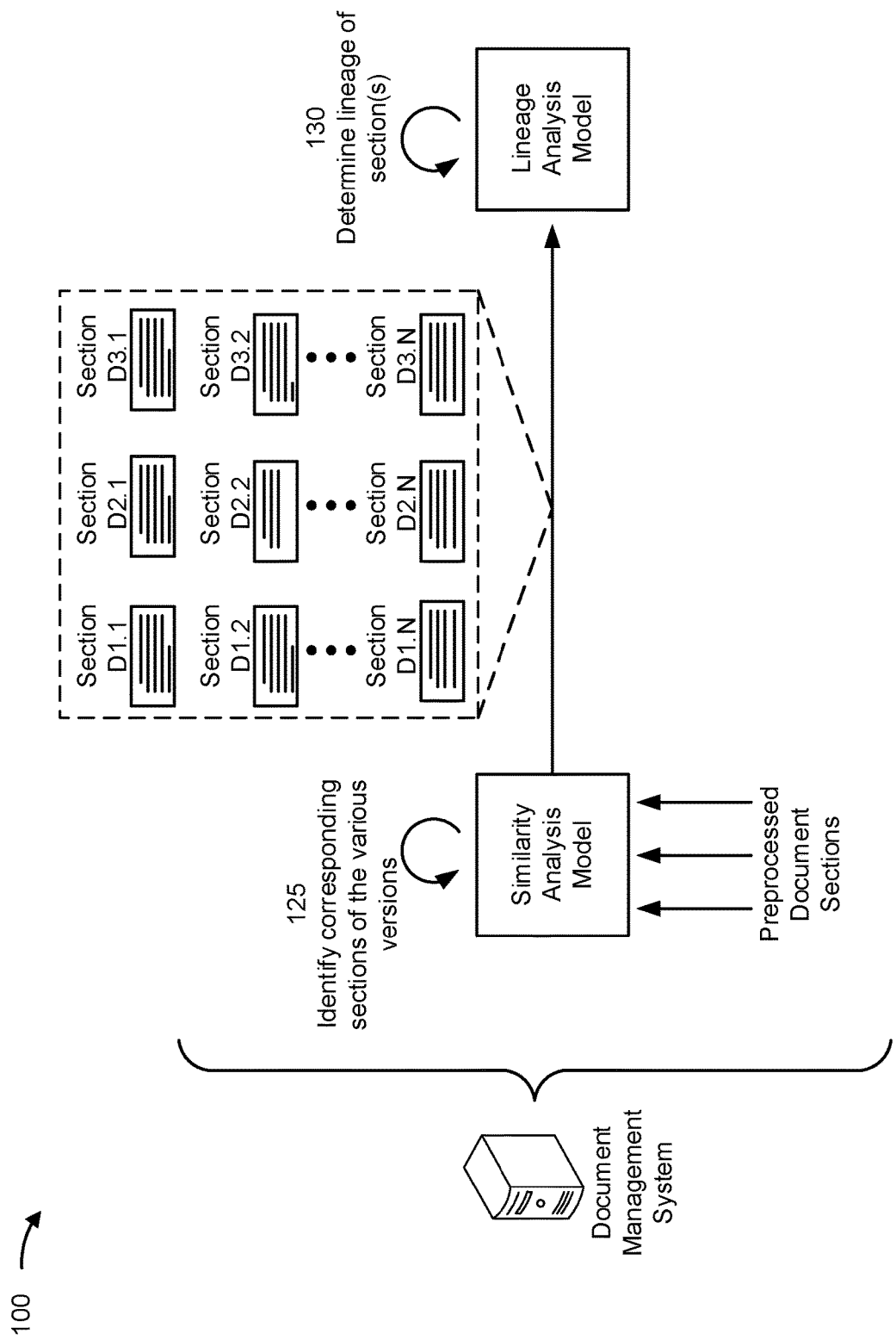

As shown in FIG. 1C, and by reference number 125, the document management system identifies corresponding sections of the various versions. For example, the document management system may receive the preprocessed document sections (e.g., the parsed sets of sections of corresponding versions of the source document) and analyze the preprocessed document sections to identify which sections in the various versions correspond to one another. The document management system may use a similarity analysis model to compare a set of sections based on the document management system determining that one or both of the sections were edited (e.g., based on the parsed sections being a different length and/or including different information).

As shown, the document management system may use or include the similarity analysis model to determine that a first section of a first version corresponds to a second section of a second version. In some implementations, the similarity analysis model may be configured to iteratively compare the first section with sections of a second version until the similarity analysis model identifies the corresponding section. The similarity analysis model may be a cosine similarity model and/or a bidirectional encoder representations from transformers (BERT) model. Accordingly, the similarity analysis model (e.g., using a cosine similarity technique and/or a BERT technique) may determine a similarity score associated with the first section (e.g., D1.2) and the second section (e.g., D2.2). The similarity analysis model may determine that the first section corresponds to the second section based on the similarity score satisfying a score threshold (e.g., a threshold corresponding to a probability threshold that the sections correspond to one another, such as 80%, 90%, or 95%). Additionally, or alternatively, the similarity analysis model may determine that the first section corresponds to the second section based on a comparison of the similarity score and a set of other similarity scores associated with the first section and other sections of the document. For example, the similarity analysis model may determine that the similarity score indicates that the first section is most likely related to the second section based on the set of other similarity scores indicating that the first section is less likely related to one or more other sections of the second version. Additionally, or alternatively, the similarity analysis model may determine that the similarity score indicates that the second section is most likely related to the first section based on a set of other similarity scores indicating that the second section is less likely related to one or more other sections of the first version.

As further shown in FIG. 1C, and by reference number 130, the document management system determines lineage of the section(s). As described elsewhere herein, the linear analysis model is trained to identify a lineage of corresponding sections of a document and/or a lineage of the document (e.g., based on the lineage of the sections). Accordingly, the document management system may use the trained linear analysis model to determine a relationship (e.g., a timing relation and/or sequential relationship) of corresponding sections of the versions, which corresponds to a lineage of a particular section of the source document.

As an example, the document management system may determine that section D1.2 corresponds to a more substantive version of section D2.2, which may indicate that D1 is a more recent version of D2 and/or that D1 was edited and/or revised from D2. As another example, the document management system may determine that section D3.2 corresponds to a more concise version of section D1.2 (and/or a more grammatically correct version of section D1.2), which may indicate that D3 is a more recent version of D1 and/or that D3 was edited and/or revised from D2. Accordingly, from the above examples, the linear analysis model may determine and/or indicate a lineage of D1, D2, and D3 as being D2>D1>D3, indicating that D2 was a source document, D1 was revised from D2, and D3 was revised from D1.

In some implementations, the document management system may utilize any available metadata (e.g., timestamps, sequence identifiers, and/or user identifiers) to verify that the lineage is accurate. For example, the document management system may verify the lineage based on one or more of metadata indicating that D2 was generated prior to D1 and D3, metadata indicating that D1 was generated prior to D3, metadata indicating that D1 was generated from D2 (e.g., according to a first sequence identifier), and/or metadata indicating that D3 was generated from D1 (e.g., according to a second sequence identifier that is subsequent to the first sequence identifier). In some implementations, if the document management system identifies metadata that conflicts with the determined lineage of the documents, the document management system may indicate the conflict in association with the lineage and/or request feedback associated with the lineage and/or the metadata.

Figure 1D:
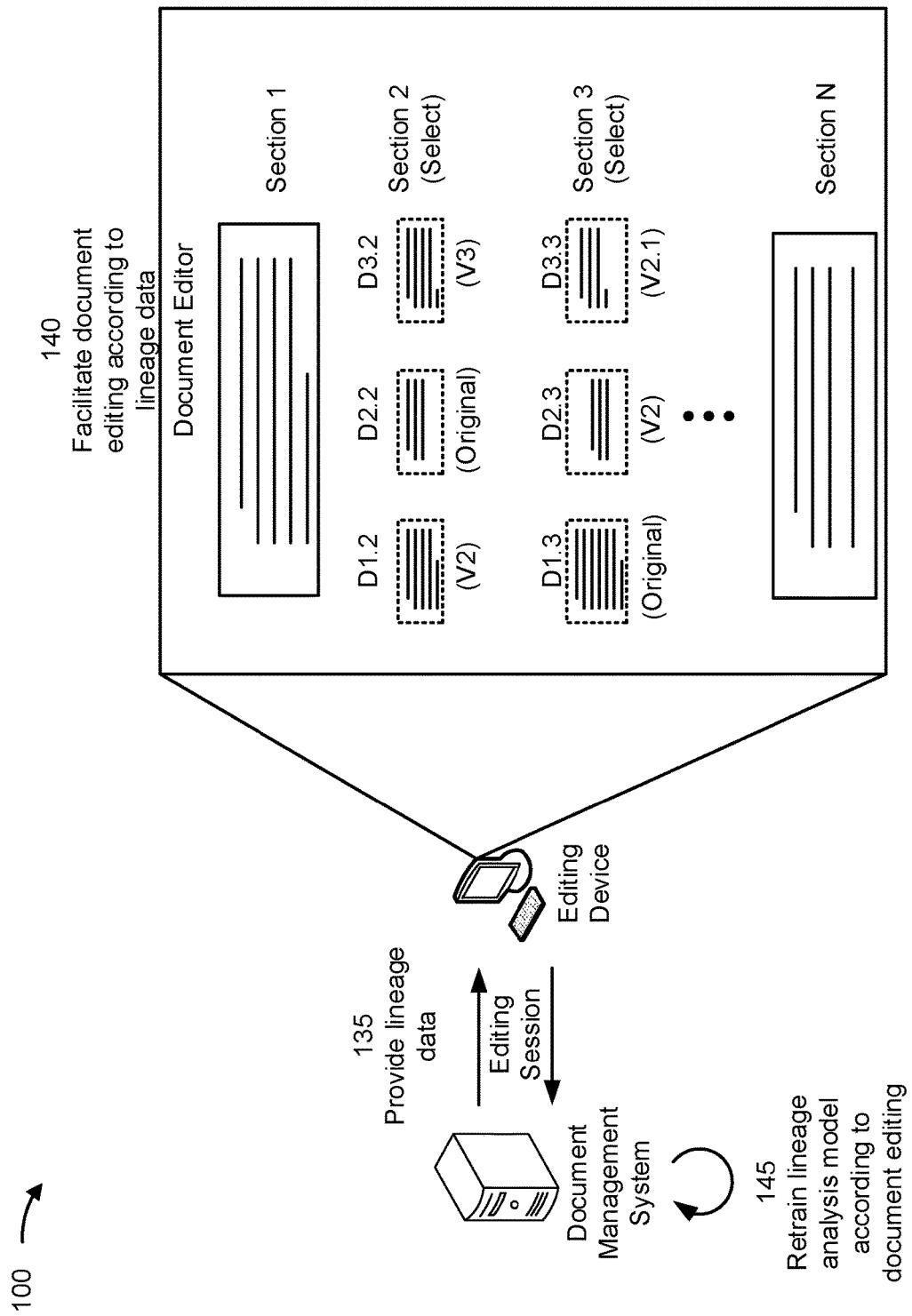

As shown in FIG. 1D, and by reference number 135, the document management system provides lineage data to the editing device. For example, the document management system may output a lineage of a section and/or a lineage of a document to indicate a sequence and/or timing associated with the documents. In this way, the editing device and/or a user of the editing device may determine which of the documents corresponds to a most recently generated and/or most recently updated version of a source document associated with D1, D2, and D3, regardless of whether metadata associated with D1, D2, and D3 can accurate be used to determine a lineage of the document and/or sections of the document.

As further shown in FIG. 1D, and by reference number 140, the editing device facilitates document editing according to the lineage data. For example, the document management system may indicate the lineage of a section of a document in association with the separate sections (e.g., a first section of a first document and a second section of a second document) to facilitate editing of the section of the document. More specifically, the document management system may cause or permit the editing device to present the lineage via a user interface and the separate sections as selectable edits (e.g., clickable selections that can be embedded into a subsequent version of the document, such as a revised version and/or a finalized version). The editing device may present, via the user interface, corresponding sequence identifiers of the selectable edits.

Referring to the example in FIG. 1D, for a first section (Section 1), the document management system may determine that the corresponding sections D1.1, D2.1, and D3.1 were the same. Accordingly, the editing device may embed the same section (which may be the original section) into a subsequent draft of the document. Further, for a second section (Section 2), the document management system may cause or permit the editing device to indicate a first sequence identifier (Original) in association with D2.2, a second sequence identifier (V2) in association with D1.2, and a third sequence identifier (V3) in association with D3.2. In this example, V2 and V3 may indicate that the versions were edited from the original version and/or that V2 and V3 are relatively more updated sections of the original second section. For a third section (Section 3), the document management system may cause or permit the editing device to indicate a first sequence identifier (Original) in association with D1.3, a second sequence identifier (V2) in association with D2.3, and a third sequence identifier (V2.1) in association with D3.3. In this example, the V2.1 and V2 may indicate that V2.1 was edited from V2 and/or is based on V2, and/or that V2.1 is a most updated version of V2 and/or the original third section. In this way, a user, based on the indicated lineage, may select one of the selectable edits to be merged or embedded within the document in order to revise or generate a subsequent draft of the document.

Additionally, or alternatively, the user may indicate a preference with respect to which of the sections is to be embedded or merged into the subsequent draft that can be used by another user to select one of the selectable edits. Accordingly, the user interface may involve a voting system that permits separate individuals and/or editing devices to determine a consensus with respect to including a particular section within a subsequent version of the document.

As further shown in FIG. 1D, and by reference number 145, the document management system retrains the lineage analysis model according to the document editing. For example, the document management system may receive feedback from the editing device in connection with a user selecting one or more of the selectable edits to form a subsequent draft of the document. In some implementations, the feedback may include an indication of which section was selected and/or embedded in the subsequent draft and/or a reason why the selected section was embedded in the subsequent draft (e.g., most updated, best grammar, most concise, most substance, and/or most improved overall, among other reasons).

Accordingly, the feedback may correspond to and/or be indicative of whether the document management system accurately indicated the lineage of the document and/or one or more sections of the document. Correspondingly, the document management system may retrain the linear analysis model using the feedback and/or the sections corresponding to the feedback. For example, for feedback received in connection with Section 2, the document management system may retrain the linear analysis model based on the feedback, the selection of one or more of, and/or the text of, D1.2, D2.2, or D3.2. In this way, the document management system may dynamically train and/or update the linear analysis model based on user feedback to cause the linear analysis model to more accurately determine a lineage of a section of a document and/or of a document.

Accordingly, as described herein, the document management system may robustly determine a lineage of a document using a machine learning model. For example, the document management system may determine a lineage of one or more sections of a document that are independently edited without using or relying on metadata, which can be inaccurate and/or incomplete. More specifically, the machine learning model may be trained to compare and/or analyze sections of a document to determine lineage of a corresponding section of the document. Moreover, the document management system may utilize one or more filtering techniques to accurately and efficiently determine a lineage of a document (e.g., using information learned from the machine learning model and/or information learned from previously analyzed versions of the document). Accordingly, the document management system may conserve computing resources that would otherwise be wasted without using a document management system, as described herein (e.g., resources that are wasted based on an inaccurate lineage and/or resources that are wasted on unnecessarily processing irrelevant sections of a document).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
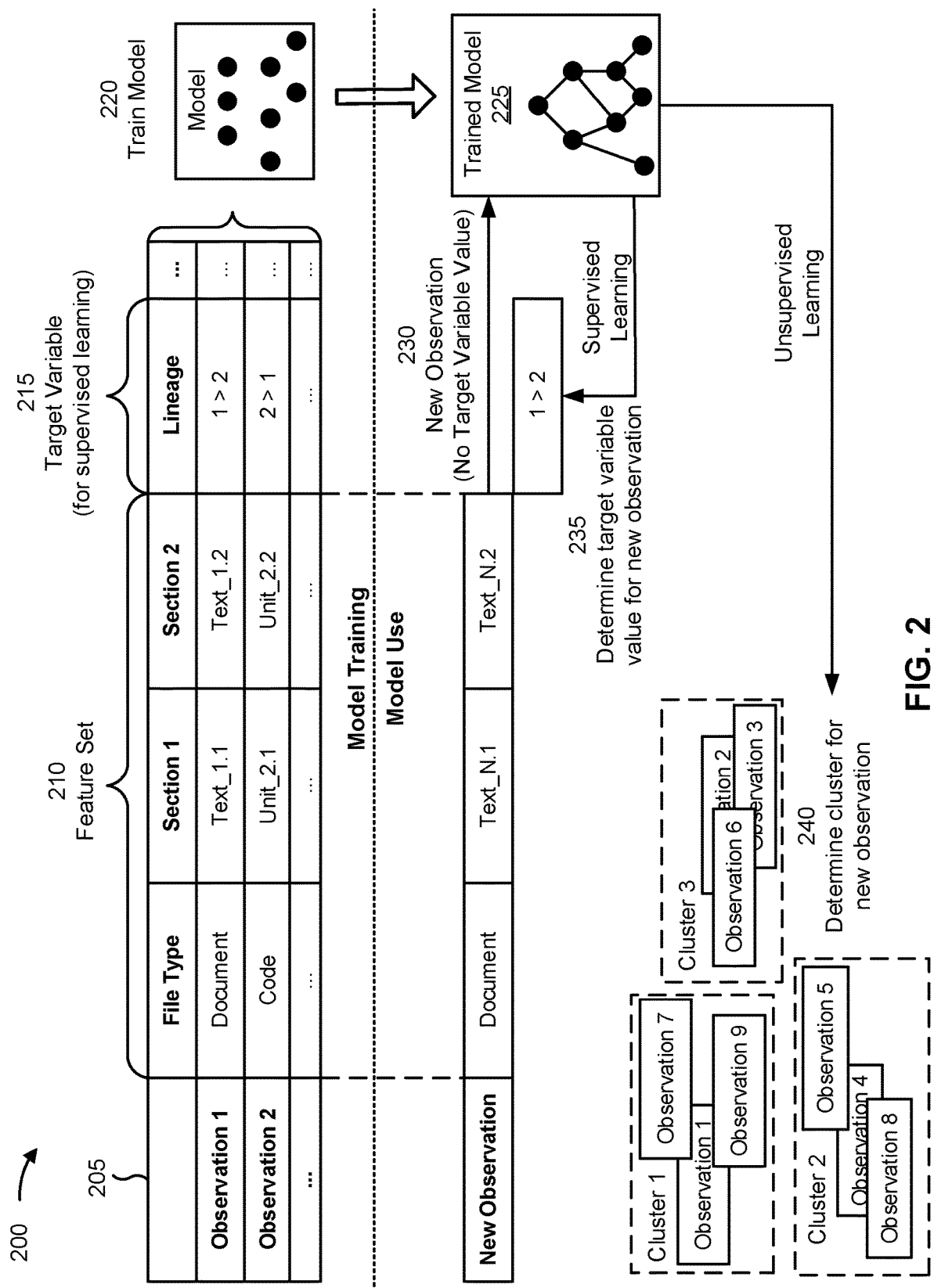
FIG. 2 is a diagram of an example of training and using a machine learning model in connection with managing document lineage.

FIG. 2 is a diagram illustrating an example 200 of training and using a machine learning model in connection with managing document lineage. The machine learning model training and usage described herein may be performed using a machine learning system. The machine learning system may include or may be included in a computing device, a server, a cloud computing environment, or the like, such as a document management system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from a source device and/or an editing device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from a source device and/or an editing device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a file type, a second feature of a first section (Section 1), a third feature of a second section (Section 2), and so on. As shown, for a first observation, the first feature may have a value of Document, the second feature may have a value of Text_1.1, the third feature may have a value of Text_1.2, and so on. These features and feature values are provided as examples, and may differ in other examples. For example, the feature set may include one or more of the following features: a section identifier, a section type, a section length, a version metadata, a version type, a version timestamp, a source identifier, and/or a source type.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a lineage, which has a value of 1>2 for the first observation, indicating that text from the first section precedes text from the second section in the lineage of the document of Observation 1.

The feature set and target variable described above are provided as examples, and other examples may differ from what is described above. For example, for a target variable of a formatting score, the feature set may include a file type, changes to a section and/or a quantity of errors corrected in the changes to the section. The formatting score may be indicative of a measure of grammatical correctness of text achieved between sections or files of the observation and/or which may be indicative of a quantity of errors in code. As another example, for a target variable of a conciseness score, the feature set may include a file type, a measure of a reduction in length and/or a semantic similarity score that represents a degree of similarity of the file after the length of the file is reduced. The conciseness score may be indicative of a degree in a difference of conciseness between sections or files of an observation while remaining semantically similar in content and/or context. In another example, for a target variable of a substantive score, the feature set may include a file type, a change in length of a section, and/or a content analysis score that represents a degree of a change in content of the section (e.g., which may be determined using a natural language processing model and/or a semantic analysis model). The substantive score may be indicative of a degree of an increase or a decrease in content in the file. In some implementations, for a target variable of an overall score, the feature set may include the file type, a formatting score, and/or a conciseness score of the observation. The overall score may be indicative of whether sections of the observation (or a document of the observation) are determined to have improved with respect to formatting (e.g., grammatically and/or typographically) and/or conciseness.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of a document, a second feature of a first section (Section 1), a third feature of a second section (Section 2), and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 1>2 for the target variable of the lineage for the new observation, as shown by reference number 235, indicating that the first section precedes the second section in the lineage. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a suggestion to select the second section for finalizing the document (e.g., as a revised version of the first section or as a most recent version of the document of the new observation). The first automated action may include, for example, editing the document based on the lineage (e.g., by merging the second section into the document rather than the first section), facilitating editing of the document by displaying the first section and the second section in association with the lineage, and/or retraining the machine learning model based on the new observation and/or feedback received from the new observation.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., revisions indicating that sections were sequentially edited), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., revisions indicating independently generated edits to a section), then the machine learning system may provide a second (e.g., different) recommendation (e.g., a suggestion to review independent edits and/or an indication of the sections being parallel in the lineage) and/or may perform or cause performance of a second (e.g., different) automated action, such as analyzing revisions to sections to identify and/or merge a particular section that improves the section with respect to formatting and/or conciseness.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above. For example, the recommendations associated with a formatting score, conciseness score, and/or overall score (referred to collectively as "scores") may include suggesting a particular section according to the scores (e.g., a section that has better formatting, is more concise, and/or is relatively improved as determined by the machine learning model). The actions associated with the formatting score may include, for example, automatically selecting or merging a section into a document that indicates an improvement in the formatting. The clusters associated with relatively higher formatting scores may include, for example, observations with sections that indicate that formatting of text and/or code (e.g., grammatically and/or typographically) was improved in one section relative to another.

In this way, the machine learning system may apply a rigorous and automated process to manage document lineage and/or facilitate document editing according to a document lineage. The machine learning system enables recognition and/or identification of tens, hundreds, thousands, or millions of features and/or feature values for tens, hundreds, thousands, or millions of observations, thereby increasing accuracy and consistency and reducing delay associated with managing document lineage and/or editing a document relative to requiring computing resources to be allocated for tens, hundreds, or thousands of operators to manually determine and/or manage document lineage using the features or feature values.

As indicated above, FIG. 2 is provided as an example. Other examples may differ from what is described in connection with FIG. 2.

Figure 3:
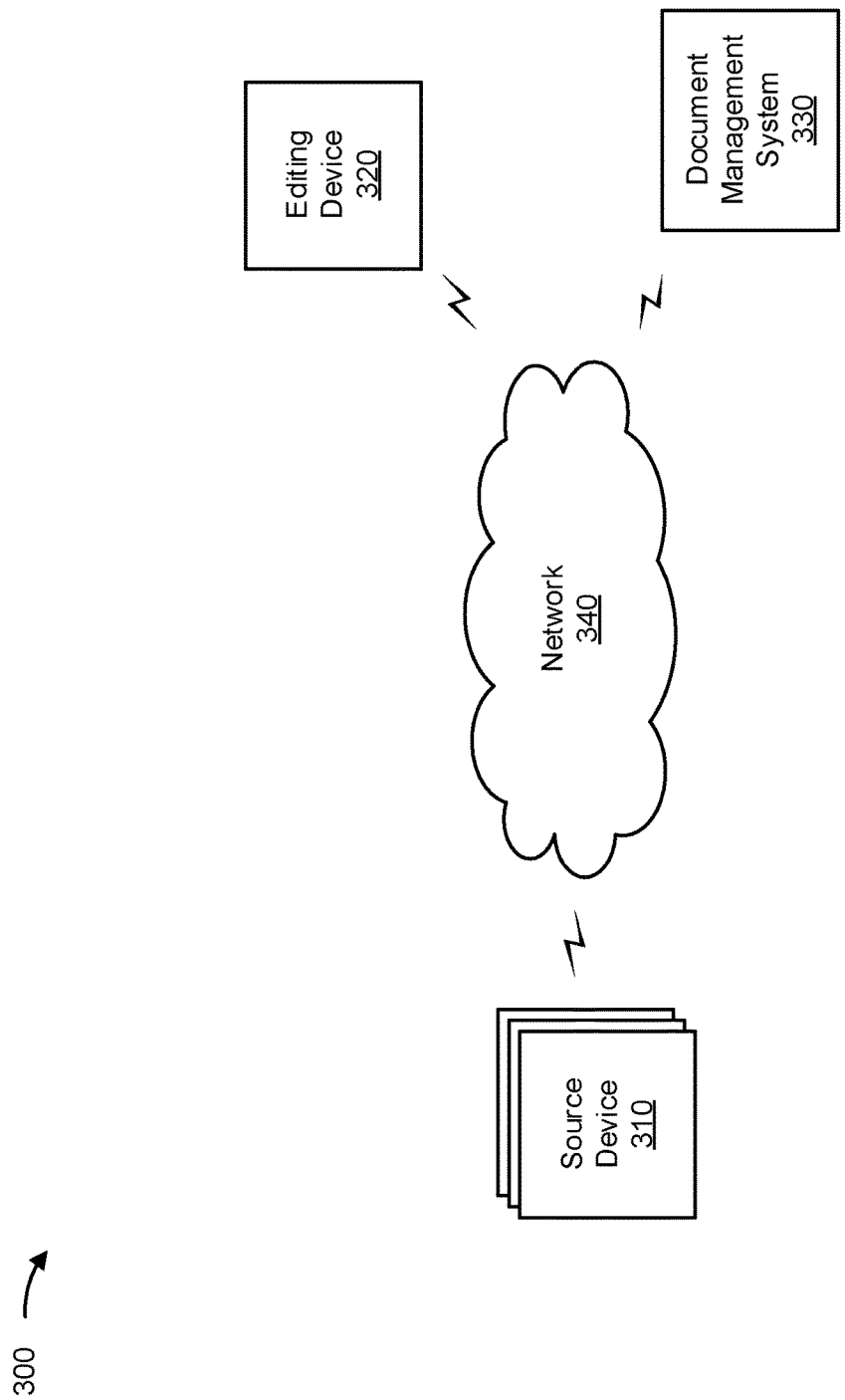
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more source devices 310, an editing device 320, a document management system 330, and a network 340. Devices of environment 300 may interconnect via wired connections, wireless connections, or a combination of wired and wireless connections.

The source device 310 includes one or more devices capable of receiving, generating, and/or providing drafts associated with a document lineage, as described elsewhere herein. The source device 310 may include a communication device and/or a computing device. For example, the source device 310 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The user device 320 includes one or more devices capable of receiving, generating, storing, processing, and/or providing information associated with editing and/or finalizing a document according to a document lineage, as described elsewhere herein. The user device 320 may include a communication device and/or a computing device. For example, the user device 320 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The document management system 330 includes one or more devices capable of receiving, generating, storing, processing, providing, and/or routing information associated with managing document lineage, as described elsewhere herein. The document management system 330 may include a communication device and/or a computing device. For example, the document management system 330 may include a server, such as an application server, a client server, a web server, a database server, a host server, a proxy server, a virtual server (e.g., executing on computing hardware), or a server in a cloud computing system. In some implementations, the document management system 330 includes computing hardware used in a cloud computing environment.

The network device 340 includes one or more devices capable of receiving, processing, storing, routing, and/or providing traffic (e.g., a packet, other information or metadata, and/or the like) in a manner described herein. For example, the network device 340 may include a router, such as a label switching router (LSR), a label edge router (LER), an ingress router, an egress router, a provider router (e.g., a provider edge router, a provider core router, and/or the like), a virtual router, and/or the like. Additionally, or alternatively, the network device 340 may include a gateway, a switch, a firewall, a hub, a bridge, a reverse proxy, a server (e.g., a proxy server, a cloud server, a data center server, and/or the like), a load balancer, and/or a similar device. In some implementations, the network device 340 may be a physical device implemented within a housing, such as a chassis. In some implementations, the network device 340 may be a virtual device implemented by one or more computing devices of a cloud computing environment or a data center. In some implementations, a group of network devices 340 may be a group of data center nodes that are used to route traffic flow through a network.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

FIG. 4 is a diagram of example components of a device 400, which may correspond to source device 310, editing device 320, and/or document management system 330. In some implementations, source device 310, editing device 320, and/or document management system 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with managing document lineage. In some implementations, one or more process blocks of FIG. 5 may be performed by a document management system (e.g., document management system 330). In some implementations, one or more process blocks of FIG. 5 may be performed by another device or a group of devices separate from or including the document management system, such as source device 310 and/or editing device 320. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include obtaining document lineage training data associated with a plurality of historical documents and corresponding lineage data of the plurality of historical documents (block 510). The corresponding lineage data may identify respective sequences of versions of the historical documents.

As further shown in FIG. 5, process 500 may include training, based on the document lineage training data, a lineage analysis model to determine a lineage of edited sections of a source document (block 520). The lineage analysis model may include a machine learning model that is trained based on respective lineages of versions of the plurality of historical documents that are identified in the corresponding lineage data. As further shown in FIG. 5, process 500 may include receiving a plurality of versions of a document. The plurality of versions of the document may include separate documents associated with a lineage of the document (block 530).

As further shown in FIG. 5, process 500 may include processing a first version of the plurality of versions to identify a first set of sections of the document and a second version of the plurality of versions to identify a second set of sections of the document (block 540). As further shown in FIG. 5, process 500 may include determining, using a similarity analysis model, that a first section from the first set of sections and a second section from the second set of sections correspond to a particular section of the document (block 550).

As further shown in FIG. 5, process 500 may include determining, using the lineage analysis model, a lineage of the particular section (block 560). As further shown in FIG. 5, process 500 may include indicating the lineage in association with the first section and the second section to facilitate editing of the particular section of the document (block 570).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for managing document lineage, comprising:
    obtaining, by a device, document lineage training data associated with a plurality of historical documents and corresponding lineage data of independent historical documents of the plurality of historical documents,
        wherein the corresponding lineage data indicates relative timing of respective versions of the plurality of historical documents;
    training, by the device and based on the document lineage training data, a lineage analysis model to determine a lineage of edited sections of a source document,
        wherein the lineage analysis model is trained based on a first historical version and a second historical version to determine whether the first historical version or the second historical version is more recent based on determining conciseness edits of the first historical version and the second historical version;
    receiving, by the device, a plurality of document files,
        wherein the plurality of document files correspond to a plurality of versions of a document;
    determining, by the device and using a similarity analysis model, that a first section from a first version of the plurality of versions corresponds to a second section from a second version of the plurality of versions;
    determining, by the device and using the lineage analysis model, a lineage of a corresponding section of the document that is associated with the first section and the second section,
        wherein the lineage indicates a sequential relationship between the first section and the second section, and
        wherein determining the lineage comprises determining which section, of the first section or the second section, is a more recent version of the corresponding section based on using machine learning; and
    outputting, by the device, the lineage in association with facilitating editing of the corresponding section of the document.

2. The method of claim 1, wherein the lineage analysis model includes a machine learning model that is trained based on respective lineages of versions of the plurality of historical documents that are identified in the corresponding lineage data.

3. The method of claim 1, wherein training the lineage analysis model comprises:
    generating a transformer encoder based on the plurality of historical documents and the corresponding lineage data; and
    training a long short-term memory decoder in association with the transformer encoder.

4. The method of claim 1, further comprising:
    prior to determining that the first section corresponds to the second section, performing natural language processing to parse the first version into a first set of sections and the second version into a second set of sections,
        wherein the first section is from the first set of sections and the second section is from the second set of sections.

5. The method of claim 1, wherein the similarity analysis model comprises at least one of:
    a cosine similarity model, or
    a bidirectional encoder representations from transformers model.

6. The method of claim 1, wherein outputting the lineage comprises:
presenting, in association with the lineage and via a display of the device, the first section and the second section as selectable edits to the document for the corresponding section,
wherein the lineage indicates at least one of a sequence associated with an order of modification of the first section and the second section.

7. The method of claim 1, further comprising:
receiving feedback associated with the lineage in association with the document being edited; and
retraining the lineage analysis model based on the feedback, the first section, and the second section.

8. A non-transitory computer-readable medium storing a set of instructions, the set of instructions comprising:
one or more instructions that, when executed by one or more processors of a system, cause the system to:
receive a plurality of versions of a document;
parse a first version of the plurality of versions into a first set of sections of the document;
parse a second version of the plurality of versions into a second set of sections of the document;
determine, using a similarity analysis model, that a first section from the first set of sections corresponds to a second section from the second set of sections;
determine, using a lineage analysis model, a lineage associated with the first section and the second section,
wherein the lineage analysis model includes a machine learning model that is trained based on respective lineages of versions of a plurality of historical documents and differences between the versions of the plurality of historical documents, and
wherein the one or more instructions, that cause the one or more processors to determine the lineage, cause the one or more processors to determine which section, of the first section or the second section, is a more recent version based on using machine learning, and
wherein the lineage analysis model is trained based on a first historical version and a second historical version to determine whether the first historical version or the second historical version is more recent based on determining historical conciseness edits of the first historical version and the second historical version; and
provide, via a user interface, the lineage in association with the first section and the second section to facilitate editing of the document.

9. The non-transitory computer-readable medium of claim 8, wherein the machine learning model comprises a long short-term memory recurrent neural network that is generated based on the plurality of historical documents, the respective lineages of the plurality of historical documents, and the differences between the versions of the plurality of historical documents.

10. The non-transitory computer-readable medium of claim 8, wherein the lineage analysis model is configured to identify the lineage based on at least one of:
identifying grammatical edits using a natural language processing model;
identifying conciseness-based edits using the natural language processing model; or
identifying substantive edits based on an increase or decrease in content between the first section and the second section.

11. The non-transitory computer-readable medium of claim 8, wherein the machine learning model comprises a convolutional neural network encoder and a long short-term memory decoder.

12. The non-transitory computer-readable medium of claim 8, wherein the one or more instructions, that cause the system to determine that the first section corresponds to the second section, cause the system to:
determine, using the similarity analysis model, that a similarity score associated with the first section and the second section; and
determine that the first section and the second section correspond to a same section based on the similarity score.

13. The non-transitory computer-readable medium of claim 8, wherein the one or more instructions, that cause the system to provide the lineage, cause the system to:
indicate, via the user interface, a first sequence identifier in association with the first section and a second sequence identifier in association with the second section,
wherein the first sequence identifier and the second sequence identifier provide an indication of which of the first section and the second section is a most updated version of a corresponding section of the document.

14. A system for managing document lineage, the system comprising:
one or more memories; and
one or more processors, communicatively coupled to the one or more memories, configured to:
obtain document lineage training data associated with a plurality of historical documents and corresponding lineage data of the plurality of historical documents,
wherein the corresponding lineage data identifies respective sequences of versions of the historical documents;
train, based on the document lineage training data, a lineage analysis model to determine a lineage of edited sections of a source document,
wherein the lineage analysis model includes a machine learning model that is trained based on respective lineages of versions of the plurality of historical documents that are identified in the corresponding lineage data, and
wherein the lineage analysis model is trained based on a first historical version and a second historical version to determine whether the first historical version or the second historical version is more recent based on determining conciseness edits of the first historical version and the second historical version;
receive a plurality of versions of a document,
wherein the plurality of versions of the document comprise separate documents associated with a lineage of the document;
process a first version of the plurality of versions to identify a first set of sections of the document and a second version of the plurality of versions to identify a second set of sections of the document;

determine, using a similarity analysis model, that a first section from the first set of sections and a second section from the second set of sections correspond to a particular section of the document;

determine, using the lineage analysis model, a lineage of the particular section, wherein the one or more processors, when determining the lineage, are configured to determine which section, of the first section or the second section, is a more recent version of the particular section based on using machine learning; and indicate the lineage in association with the first section and the second section to facilitate editing of the particular section of the document.

15. The system of claim 14, wherein the corresponding lineage data identifies timing of the versions or sequence identifiers of the respective lineages of the versions.

16. The system of claim 14, wherein the one or more processors, when training the lineage analysis model, are configured to:

generate a long short-term memory recurrent neural network based on the plurality of historical documents and the corresponding lineage data.

17. The system of claim 14, wherein the one or more processors, when training the lineage analysis model, are configured to:

generate a convolutional neural network encoder based on the plurality of historical documents and the corresponding lineage data; and train a long short-term memory decoder associated with the convolutional neural network encoder.

18. The system of claim 14, wherein the one or more processors, when processing the first version and the second version, are configured to:

parse, using a natural language processing model, the first version into the first set of sections and the second version into the second set of sections.

19. The system of claim 14, wherein the one or more processors, when determining that the first section and the second section correspond to the particular section, are configured to:

determine, using the similarity analysis model, a similarity score associated with the first section and the second section; and determine that the first section and the second section correspond to a same section based on at least one of:

the similarity score satisfying a threshold score, a comparison of the similarity score and a first set of other similarity scores associated with the first section and other sections of the document, or a comparison of the similarity score and a second set of other similarity scores associated with the second section and the other sections of the document.

20. The system of claim 14, wherein the one or more processors, when indicating the lineage, are configured to:

provide, in association with the lineage and via a user interface, the first section and the second section as selectable edits to the document for the particular section, wherein the lineage indicates at least one of a sequence associated with an order of modification of the first section and the second section.

* * * * *